PLANAR MEDIA MAGNETIC CODE IDENTIFICATION SYSTEM

Original Filed April 12, 1960 4 Sheets-Sheet 1

INVENTOR.
DONALD S. OLIVER
BY Joseph Weingarten
Atty.

PLANAR MEDIA MAGNETIC CODE IDENTIFICATION SYSTEM
Original Filed April 12, 1960 4 Sheets-Sheet 2
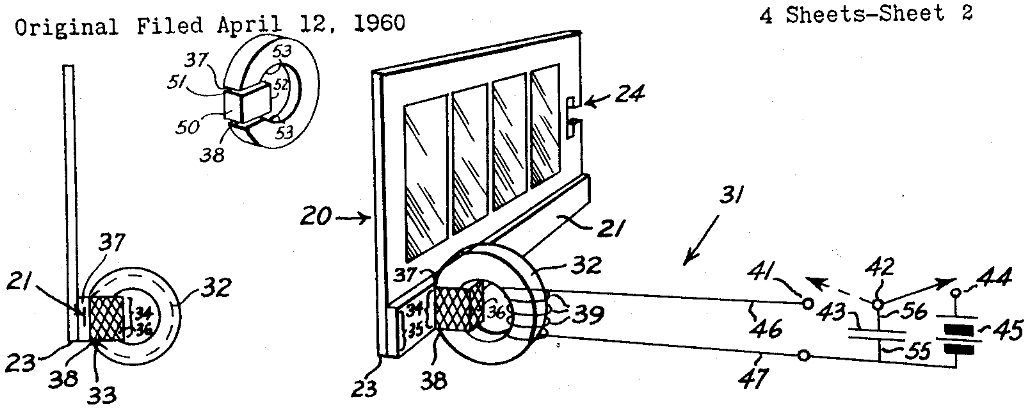
FIG. 4-A, FIG. 4
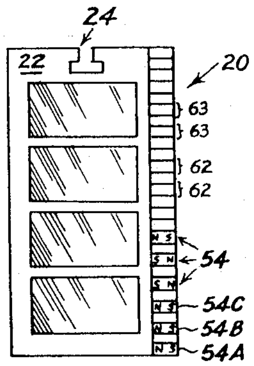
FIG. 5
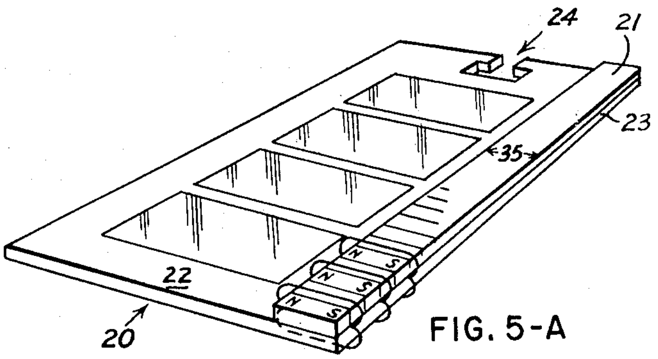
FIG. 5-A
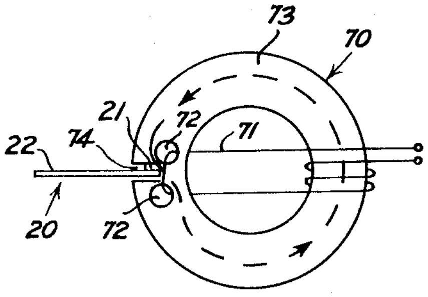
FIG. 6
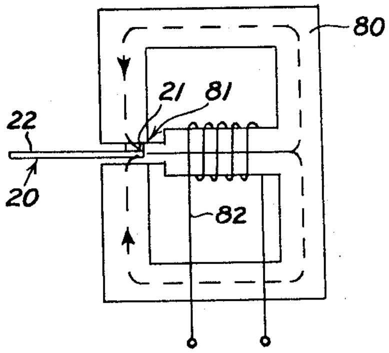
FIG. 7
INVENTOR.
DONALD S OLIVER
BY
Joseph Weingarten
Atty.

PLANAR MEDIA MAGNETIC CODE IDENTIFICATION SYSTEM

Original Filed April 12, 1960 4 Sheets-Sheet 3

INVENTOR.
DONALD S. OLIVER
BY
Joseph Weingarten
Atty.

INVENTOR.
DONALD S. OLIVER
BY
Joseph Weingarten
Atty.

United States Patent Office 3,293,629
Patented Dec. 20, 1966

3,293,629

PLANAR MEDIA MAGNETIC CODE IDENTIFICATION SYSTEM

Donald S. Oliver, West Acton, Mass., assignor to Itek Corporation, Lexington, Mass., a corporation of Delaware Continuation of application Ser. No. 21,754, Apr. 12, 1960. This application Apr. 2, 1965, Ser. No. 449,358
5 Claims. (Cl. 340—174.1)

This is a continuation of U.S. application 21,754 filed April 12, 1960, now abandoned.

This invention relates to a method and means for magnetic recording and reading; it particularly concerns (1) means for transversely recording on a magnetic stripe in a manner permitting the recorded information to be read from the edge of the stripe and (2) a method of sensing magnetic data which has been prerecorded transversely, as aforesaid.

The science of data storage and retrieval in a magnetic medium is well advanced and a variety of different embodiments have been devised therefor. Most familiar of the techniques is that of recording data signals and reading on magnetic wire or magnetic tape arranged as a continuous ribbon of material which is advanced from one reel to another. In this way, by putting a stripe of magnetic material on cinemaphotographic film, it is possible to correlate a sound track recorded on the stripe with motion of the image frames.

Data storage on film is, of course, well known; microfilming of graphic information is now conventional. In its usual embodiment, information is reduced 30–50 times and arranged in an array of discrete frames on the continuous film ribbon and wound on a reel. Location of a particular frame on the reel in the simplest applications is performed by manual operations and visual observation until the desired data is brought into view. A more sophisticated technique employs a reel of film having a magnetic stripe along one edge. This stripe has data recorded thereon identifying the adjacent or a nearby image frame. An associated mechanism may be connected to the magnetic transducer sensing the identification data to stop the reels and present a preselected frame to the viewer on a projection screen.

Because of the obvious inconvenience of storing on reels data which is subject to random retrieval, various attempts have been made to divide up the image frames into film segments or film chips which can be stored in a compact array. In one system individual microfilm segments are secured to or made part of a punched card and are handled by familiar punched card sorting techniques. In another current system, identification data is put on the film surface in the form of an optically scanned digital code. A major disadvantage of such a system is that it requires that at least part of the surface of each chip be made accessible during identification scanning. This is time consuming, definitely increasing the time required to search a given store and probably most important, increases mechanical complexity while simultaneously exposing the surfaces to abrasion and thereby hastening deterioration. Precisely the same drawbacks would exist if the film had an identification magnetic stripe coded in the conventional manner; as with an optically sensed coded surface, conventional recording on a magnetic stripe would require access to the surface of the stripe.

A simple analogy may be made by a comparison with the technique of searching for a particular book title out of a multitude of books arranged in the usual manner on shelves. Assuming the books had no identification on the spines, if each book had to be removed, even partially, from the shelf in order to observe the title on the front cover, the rapidity of such a search would be extremely limited; retrieval time for a particular title would be excessive. It is obviously far more convenient and considerably faster to scan the title or identification numbers from the spine surfaces which are exposed adjacently on the shelves. In a comparable manner, scanning a multitude of discrete, information bearing sheets such as film chips, which are stacked in a closely packed array by reading an identification code off the chip edges might become the solution for rapid search and immediate access to a predetermined chip. But conventional magnetic recording and reading techniques do not permit the certain and unambiguous sensing of magnetic information from the edge of a magnetic stripe.

It is an important object of this invention accordingly, to provide apparatus for recording an identification code in a magnetic medium, such as the striping on a film chip, which may be sensed by transducer means positioned beyond the outer edge of the stripe. Another important object of this invention is to provide a method for sensing magnetic data from the outer edge of the stripe.

Basically, the invention comprises magnetization of a magnetic stripe in a direction transverse thereto and sensing the fringing flux which exists (under the proper circumstances) at the outer edge of the stripe. Transverse is here defined as the dimension across the width of a medium which is termed longitudinal along the length of the stripe, its thickness being much less than its width. The process may utilize, for example, an information bearing sheet such as a film chip having a stripe of magnetizable material on one surface at an edge thereof. A special magnetic recording means is brought into juxtaposition with the magnetic stripe and aptly positioned to cause transverse magnetization in a binary coded pattern of bits having a code arranged in a plurality of unique N and S orientations. The edge of the film chip carrying the magnetic stripe is caused to have relative motion with a stacked transducer unit having a sensing or reading head for each code bit. The fringing flux which exists beyond the outer stripe edge links the gap of each head and may thus be detected. It should be noted that the possibility of reliably sensing the encoded bits from the outer edge of a magnetic stripe turns upon achieving a substantial "fringing" flux, i.e., a transversely magnetic recorded code bit must have a significant flux external the stripe edge to properly coact with an appropriate transducer pick-up or reading head.

Transverse recording is accomplished in the present invention by having a recording head with an unconventionally long gap between the pole faces, the length of which is approximately equal to or greater than the width of the magnetic stripe. Placed within the gap of the recording head is an electrically conductive nonmagnetic material. When this recording transducer is properly energized, eddy currents in the material within the gap causes the magnetization flux to be detoured outside the gap but substantially parallel to its length. The accessible outer surface of the material filling the gap of the recording transducer is placed in contacting, transverse relationship with the magnetizable stripe. Since the flux is forced to detour outside the gap it causes a remanent, transverse magnetized pattern to be formed in the stripe which has a substantial field beyond the external edge of the stripe.

An alternative technique for surface recording magnetic information and sensing from the edges of the medium might be recording perpendicular to the medium, i.e., through the thickness of the material. In a sense, this would be the obvious technique but on closer examination certain drawbacks come into focus. If the medium is a conventional magnetic coating of 1 mil thickness the length of the magnetic bit formed in the medium is also about 1 mil. Since the track width of recording transducers is generally 10–50 mils, the aspect ratio in perpendicular recording, that is, the ratio of magnet length (L) to the pole face area (A) is not good; because of the small L, the effect of self-demagnetization is appreciable. To increase the aspect ratio requires decreasing the width of the recording transducer gap thereby decreasing the flux available. With a medium 25 mils wide, and 1 mil thick, and a 40 mil gap width, defining aspect ratio for comparison purposes as $L/\sqrt{A}$, where $L=1$ $A=25\times 40$ therefore $$\frac{L}{\sqrt{A}}=\frac{1}{\sqrt{1000}}$$

Transverse recording produces an aspect ratio $L/\sqrt{A}$ wherein the length (L) of the magnet is the width of the stripe which will be, perhaps, 25 mils. Using a 40 mil recording track yields an aspect ratio of $25/\sqrt{40}$, 125 times better than that achieved with prependicular recording.

There is still another disadvantage of perpendicular recording; spacing loss is increased. Spacing loss is the fall off of induced voltage in a reading head as it is moved away from the recorded medium. As the distance between the magnetized bit and the transducer gap becomes larger, the relative distances from the gap to each of the two poles of the bit becomes proportionately smaller—further causing a cancellation of the field of each pole at the reading head.

An unexpected advantage results from the technique of transverse recording and edge sensing. In the general equation for the voltage induced in the reading head $$\frac{d\phi}{dt}=-\frac{\mu}{\mu+1}4WvI_m(1-e^{-2\pi\delta/\lambda})e^{-2\pi d/\lambda}\cos(\omega t)$$

the term $e^{-2\pi d/\lambda}$ tells how the reproduced voltage depends on spacing. In order to compare this computed effect with the experimentally observed one it is necessary to put it in decibel form by computing twenty times the $\log_{10}$ of $e^{2\pi d/\lambda}$ giving:

Spacing loss$=54.6$ $(d/\lambda)$ in decibels; where $d$=spacing between a head and recording medium and $\lambda$=recorded wavelength.

It was discovered that as the sensing transducer employed in this invention was increasingly spaced away from the magnetically coded edges the rate of signal decrease was significantly less than what was predicted from experience with conventional recording and reading techniques. The experimental data and interpretation of resulting curves is elaborated more fully in the detailed description following.

Other objects and features of the invention will become more apparent as the description proceeds in which:

FIG. 4 is a perspective view of a recording transducer in operative position, and appropriate recording circuitry shown schematically;

FIG. 4A is a detail of the recording transducer shown in FIG. 4;

FIG. 5A is a diagrammatic illustration of a film chip with a binary coded edge;

FIG. 5B is perspective view of the film chip illustrated in FIG. 5A, the magnetic fields of some of the bits shown in their conventional representation;

FIGS. 6 and 7 show alternative transverse recording means;

FIG. 8A shows diagrammatically the spatial relationships involved in the edge sensing technique;

FIGS. 8B and 8C are corresponding waveforms for phenomena resulting from the interrelationships shown in FIG. 8A;

Figure 1:
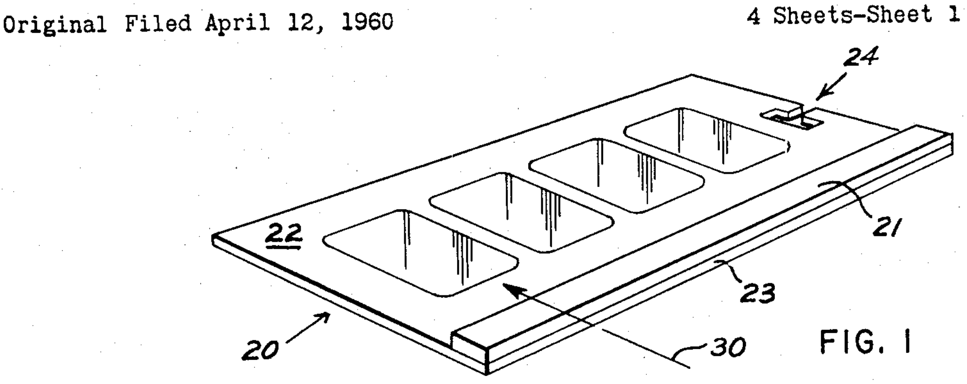
FIG. 1 is a perspective view of a data bearing sheet such as a film chip, having a stripe of magnetic material on a surface near an edge, the stripe as shown being somewhat exaggerated in thickness.
Figure 2:
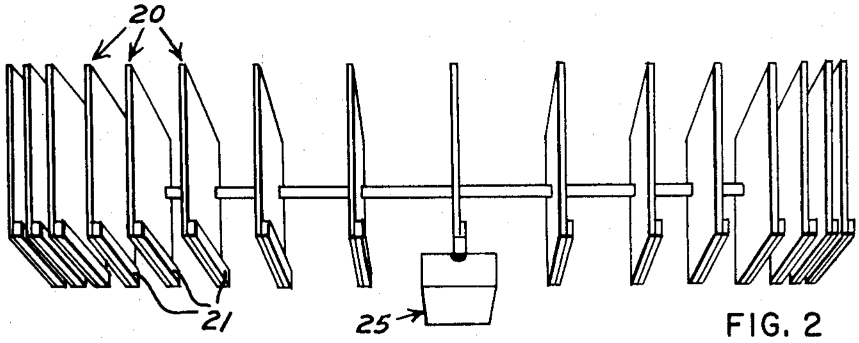
FIG. 2 is a plan view of a number of film chips having relative motion with respect to a magnetic transducer reading unit which is positioned adjacent the chip edges having the magnetic striping.

One form of data-bearing sheet which embodies the principles of this invention can be seen in FIG. 1. This particular data sheet 20, called a film chip, is a length of 16 mm. film suitable for use in microfilming which has a thin, narrow stripe 21 of magnetic material on the base surface 22 at one edge 23. Means which form no part of this invention are provided at 24 for permitting a plurality of physically similar film chips 20 to be arranged in a densely stacked storage array, such as a magazine (not shown), and to slide or hinge one by one past a magnetic transducer reading head 25 as shown in FIG. 2.

Using conventional identification techniques, the searching of a stack of film chips 20 would require access to the surface 22 of each chip. For example, referring to FIG. 2, a plurality of film chips 22 can be seen in diagrammatic representation. If the chips 20 were comparable to books arranged on a library shelf, techniques which employ an optically sensed identity code or a conventional face sensed magnetic code on the film surface 22, would require sequentially displacing each chip from the stack and causing each coded surface to be displaced for sensing until the desired chip was located. As shown in FIG. 2, if a magnetic field exists at the edges of the chips 20, a magnetic transducer reading head or pickup 25 having relative motion in respect to the coded edges 23 can rapidly scan all of the chips 20 in the stack or magazine without disturbing or displacing any of the chips.

As clearly indicated in FIG. 1 by the arrow 30, the desired magnetization must be in a direction transverse to the magnetic stripe 21. One arrangement generally designated at 31 for accomplishing transverse magnetization can be seen in FIG. 4. A magnetic core 32 has a gap 33 with a length 34 substantially equal to the width 35 of the magnetic stripe 21, the core being positioned with that gap transversely across the stripe. The gap 33 has an insert 36 between the pole faces 37 and 38 made of a material which is non-magnetic and possesses good electrical conducting properties, for example, copper. A number of turns 39 of wire are coiled around the core 32 and connected through one terminal 41 of a two-position switch 42 to a large capacitor 43. The other terminal position 44 of the switch 42 disconnects the capacitor 43 from the core winding 39 and connects it to a charging source such as a battery 45. When the switch 42 is closed in the capacitor charge position at 44, the capacitor 43 charges in the expected manner until the potential thereacross equals the potential of the source 45 or until charging is interrupted by disconnecting the switch. If the switch 42 is now shifted to terminal 41 connecting the charged capacitor 43 to the core winding 39, the capacitor will discharge through the winding, creating a sharp initial current pulse which then decays at a considerably slower rate.

The initial, steeply rising pulse of current causes a corresponding magnetic flux in the core 32 having a direction which is determined by the direction of current flow in the winding 39. Without the non-magnetic insert 36 in the gap 33 between the pole faces 37 and 38 of the core 32, the magnetic flux in the core would bridge the relatively high reluctance air gap to complete the magnetic circuit. However, the conductive insert 36 has induced therein by the increasing magnetic field, substantial eddy currents which produce a magnetomotive force (M.M.F.) opposing the initial $d\phi/dt$. This opposite M.M.F. within the insert 36 tends to force the primary magnetic flux in the core 32 outside and around the external margin of the gap 33 and the insert and transversely through the magnetic stripe 21 as shown in FIG. 4. The insert 36 has an exterior surface 50 which is substantially flush with the external margins 51 of the gap faces 37 and 38. The internal surface 52 of the insert 36 extends considerably beyond the internal margin 53 of the gap faces 37 and 38. As a result, when the core winding 39 is energized, the counter-M.M.F. induced in the insert 36 will be more effective in blocking a flux path in the interior of the core 32 than exterior to it. Accordingly, the path of least reluctance will be parallel to the exterior face 50 of the insert 36 and through the stripe 21.

The capacitor discharge pulse is initially very steep causing $d\phi/dt$ to be high, and it then decays considerably more slowly resulting in a low $d\phi/dt$. After a brief period the recording assembly 31 may be removed from the stripe 21, the stripe having a remanent magnetic field creating a code bit 54 of some predetermined orientation. Of course, the direction of the field across the width 35 of the magnetic stripe 21 determines the orientation of the magnetic poles of the remanent magnetic field. To reverse the polar orientation requires only that the charging current in core winding 39 be reversed. This may be accomplished by simply connecting leads 55 and 56 of capacitor 43 to the winding at 46 and 47 respectively.

While the foregoing description is concerned with recording a single transverse bit or sector 54, it is clear that a plurality of bits 54A, B, C, D, etc., may be recorded simultaneously to encode a single chip 20 with its complete binary identification code. A chip is shown in FIGS. 5A and 5B which has a plurality of bits 54 in a coded pattern.

A considerable advantage of transverse recording in the manner described is that recording takes place while the magnetic stripe 21 is fixed relative to the recording unit 31. This permits accurate positioning of an image-bearing entity 20 in respect to recording transducer 31 so that corresponding tracks or segments 54 on each entity are at the same physical location relative to the dimensions of all the physically identical entities. The proper registration of succeeding chips 20 with respect to the tracks on a reading head 25 is thus assured.

Figure 3:
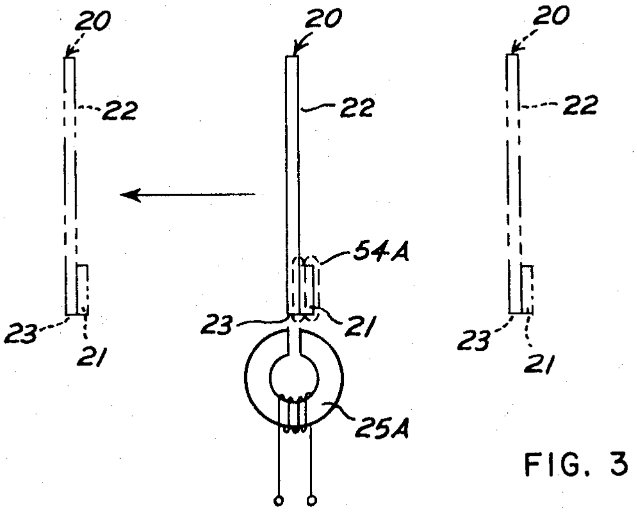
FIG. 3 is a detail view of an individual chip showing a single channel transducer head adjacent to a single recorded bit.

As explained above, each chip 20 is given a particular identification code of an arrangement or pattern of binary polarized magnetic bits 54 on the magnetic stripe 21 (see FIGS. 5A and 5B). One such bit 54A represented by the dotted lines in FIG. 3 is shown in operative relationship with a single channel element or head 25A of the reading transducer 25. As the magnetized segment 54A passes the reading head channel 25A, a voltage is induced therein having a magnitude which is a function, amongst other factors, of the field strength of the bit external the edge 23 of the stripe 21, head-medium spacing and the relative velocity between head 25A and bit 54A.

Figures 8, 8A, 8B:
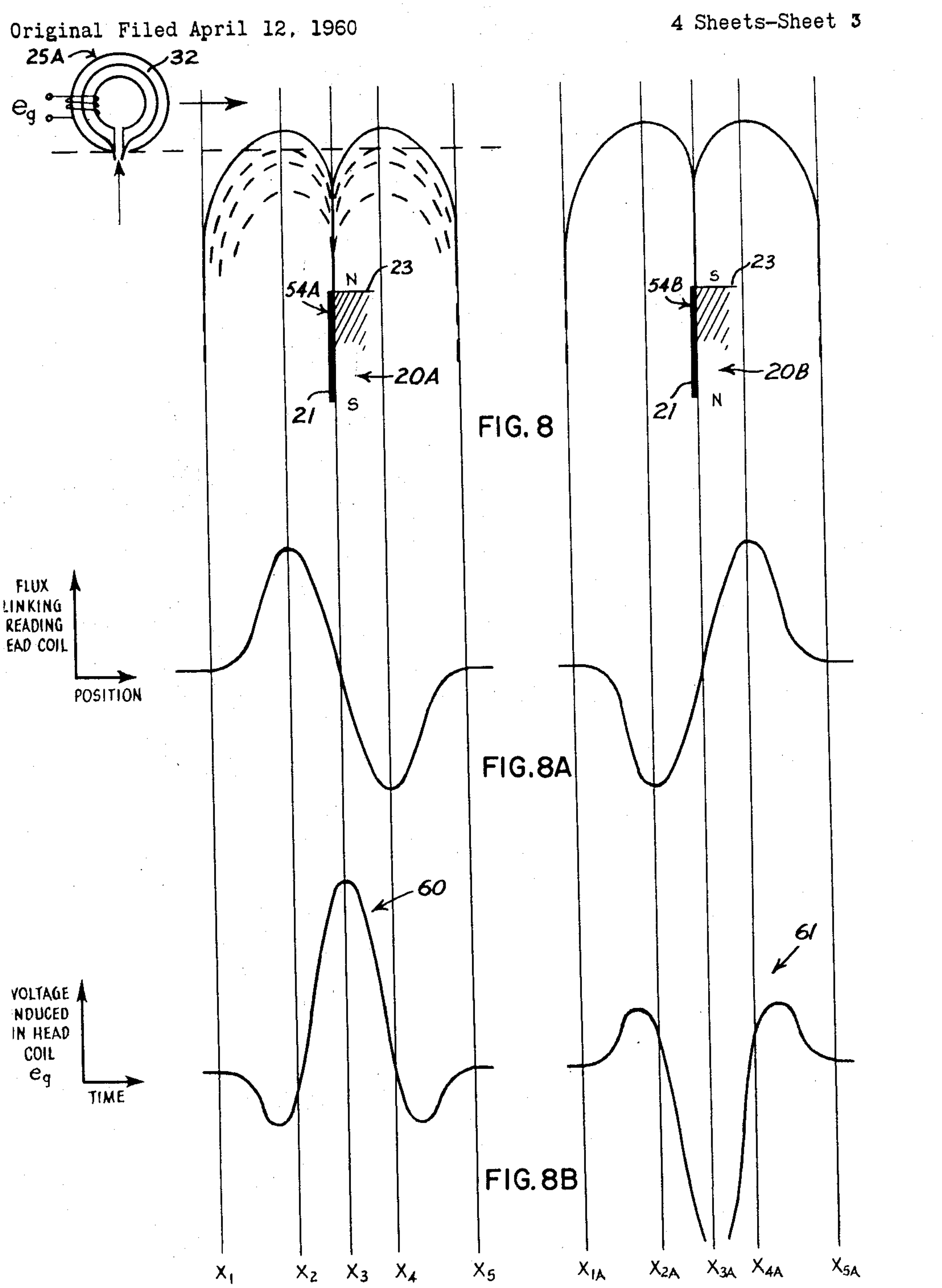
Figure 9:
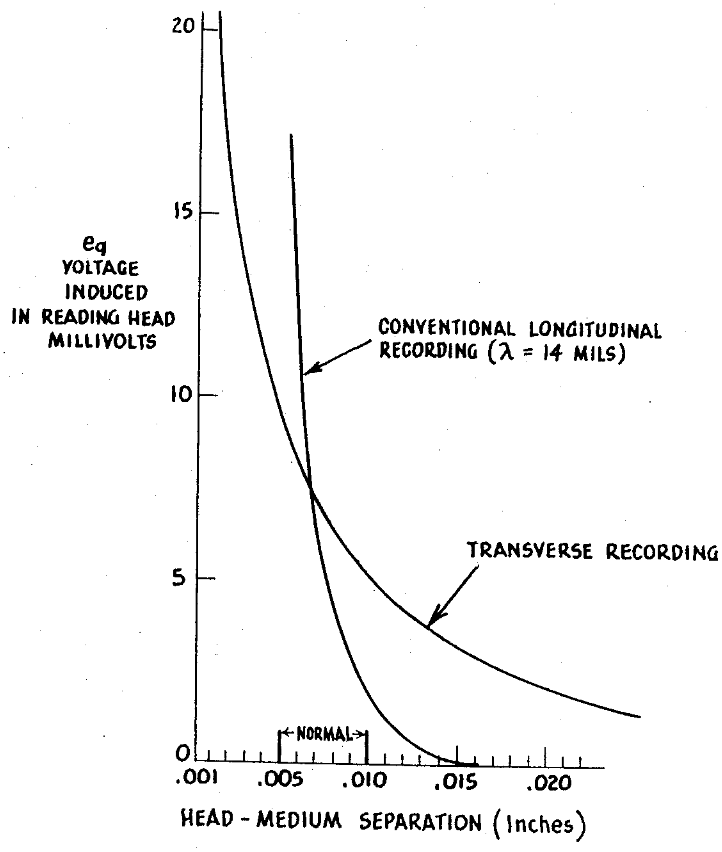
FIG. 9 is a diagram indicating relationship of induced voltage with transducer spacing comparing conventional and transverse recording.

This relationship is shown in the presentation of FIGS. 8A, 8B, and 8C wherein two adjacent film chips 20A and 20B are shown in fragmentary detail. A single element 25A from the multitrack reading head 25 is indicated having relative motion in respect to code bit segments 54A and 54B of the two chips which are located at the same physical location on each chip. As the external field of the magnetized segment 54A on chip 20A comes closer to the transducer pickup 25A, it will be noted from FIG. 8B that the flux represented by the downward arrows in FIG. 8A increasingly links with the iron core 32 of the pickup to a maximum point; the linkages decrease more rapidly to zero when the head is just opposite the magnetic bit and proceeds to a negative maximum as the head passes center, the flux linkage rising to zero as the head passes out of the external field. The voltage $e_g$ induced in the reading head 25A, is as well known, a function of the expression $d\phi/dt$; the flux linkages (plotted in FIG. 8B) between the reference points $x_1$ and $x_5$ yield the signal pulse 60 illustrated in FIG. 8C.

An identical sequence will occur for the adjacent film chip 20B, the only difference being the reversed polarity of the corresponding magnetic bit 54B. This difference yields an identical but opposite-going pulse 61 from that derived from the corresponding bit 54A of the previous chip 20A.

In the usual circumstances, the unique identity code for a particular film chip 20 will consist of a number of variously polarized transverse segments 54 making up a unique pattern of magnetic bits; such a pattern is diagrammatically indicated by FIG. 5A, and the orientation of the magnetic fields making up the code pattern can be seen in the hypothetical representation of FIG. 5B. A standard, commercially available transducer 25 having the individual sensing elements 25A, B, C, D, etc., may thus be positioned in operative relationship with respect to the magnetized segments on the magnetic stripe 21 corresponding to each sensing element of the transducer pickup. Relative motion of each chip 20 in respect to the stacked multi-element, transducer 25 produces a pattern of electrical pulses corresponding to an identity code comprising the pattern of magnetic bits 54A, B, C, D, etc., on the edge 23 of each succeeding film chip.

Having now described the invention in terms of its general aspects and embodiments, it is now useful to turn to specific illustrations of its operation. A representative information-bearing sheet 20 which can successfully exploit the possibilities inherent in edge sensing of transversely recorded magnetic data is a film chip. A typical film chip 20 will be formed from a 2¼ inch length of 16 mm. film having a ferric oxide stripe 21 at one long edge 23 thereof. Such a film chip 20 may be severed from standard, commercially available film stock which has a magnetic stripe 21 designed for a sound track application. The dimensions of the stripe are 0.025″ in width by about .001″ thick.

Because a standard, commercially available reading head 25 is provided with fourteen channels per inch, each channel being .040″ wide with approximately the same spacing between channels, it is feasible to record and read a 28 bit code on a chip 2¼″ long. Recording heads 31 with multiple elements 31A, B, C, D, etc., can be positioned in respect to the edges 23 of each chip 20 as previously described and the coded identity designation put on the magnetic stripes 21 as different unique patterns of polarized magnetic bits 54. The width 62 of each magnetic segment 54 or track recorded, and the space 63 between adjacent segments are a function of the specifications of the standard twenty-eight channel reading head 25. It should be emphasized, however, that the principle of transverse magnetization and edge sensing thereof is not dependent on conventional dimensions. Considerable success has been shown using a bit packing density of double that described, viz., recording a .020″ track with a spacing of .040″ between adjacent tracks. Moreover, careful recording techniques to reduce the flux fringing the primary field will permit closer spacing of adjacent tracks to further increase the number of tracks per unit distance along the magnetic stripe 23.

In a typical recording circuit of the type illustrated in FIG. 4, the recording circuit for each track or bit 54 is formed on a stripe of .025″ width. A D.C. voltage source 45 which can be a battery of 10–15 volts is connected selectively in either polarity to capacitor 43. To avoid ringing, a large capacitor 43, for example a 100 μfd.

electrolytic, is employed. The RC time constant of the charging circuit for capacitor 43 is relatively short. The discharge circuit is through the core winding 39 where $L=300$ mh. at 1 kc. and $R=54$ ohms. The $L/R$ ratio is kept low to produce the desired fast rise time for a high $d\phi/dt$.

Clearly, the technique for achieving transverse polarization of code sectors 54 along the stripe 21 is not limited to the particular form of apparatus described above, a so-called "in-gap" technique is also available. In the slotted toroid 70 of FIG. 6, an auxiliary winding 71 is wound through holes 72 punched in the annular core 73 on either side of a radial notch 74 in the external margin of the core. The magnetomotive force developed by this winding 71 saturates the material of core 73 in the area around these holes 72 thus diverting the flux produced by a main winding 75 through the magnetic striping 21 in the notch 74 in a transverse direction.

In FIG. 7, the geometry of a core 80 is such that the core material is saturated in the area 81 of the magnetic stripe 21 so that most of the magnetomotive force produced by the coil 82 is impressed across the width 35 of the stripe, thereby magnetizing it in a transverse direction.

It is evident that still other variations will occur to those skilled in this art and it is not intended therefore to confine the invention to the precise embodiment described here, but rather to be governed by the spirit of the invention as defined within the ambit of the claims, accordingly

I claim:

1. A data bearing media identification system comprising:

(a) planar media having data recorded on the planar faces of said media, (b) a magnetizable region affixed only to planar faces of said media adjacent edges of said media and magnetized to produce remnant flux emanating from said edges in a direction substantially perpendicular to said edges in accordance with an identity code indicative of said data recorded, and (c) means for determining the identity of said media, said identification means including means for sensing the remnant flux emanating from said edges.

2. A data bearing media identification system as set forth in claim 1 wherein the magnetic poles formed in said magnetizable region are positioned substantially along a line normal to the planes of the edges of said media.

3. A data bearing media identification system as set forth in claim 1 wherein said magnetizable region is a strip secured to said planar faces.

4. A data bearing media identification system as set forth in claim 3 wherein the magnetic poles formed in said magnetizable region are positioned substantially along a line normal to the planes of the edges of said media.

5. A method of identifying a plurality of planar data bearing media comprising the steps of:

(a) recording data in planes substantially parallel with the planes of said media, (b) recording remnant magnetic flux in accordance with an identity code indicative of said data recorded within strata of magnetizable material lying in planes substantially parallel with the planes of said media and positioned adjacent the edges of said media and, (c) sensing the remnant magnetic flux emanating substantially perpendicular to the edges of each of said data bearing media to identify said media.

References Cited by the Examiner

UNITED STATES PATENTS 2,857,059 10/1958 Goerlich et al. ______ 340—174.1
3,034,643 5/1962 Keller et al. ________ 340—174.1

BERNARD KONICK, *Primary Examiner.*

A. I. NEUSTADT, *Assistant Examiner.*